United States Patent [19]

Tsang et al.

[11] Patent Number: 5,830,265
[45] Date of Patent: Nov. 3, 1998

[54] COUNTERION SUBSTITUTION IN MACROMOLECULAR CHROMOPHORE (MMC) FOR INK-JET PRINTING INCLUDING TEXTILE, LARGE FORMAT AND OFFICE FORMAT PRINTERS

[75] Inventors: Joseph W. Tsang; John R. Moffatt, both of Corvallis, Oreg.

[73] Assignee: Hewlett-Packard Company, Palo Alto, Calif.

[21] Appl. No.: 742,789

[22] Filed: Oct. 31, 1996

[51] Int. Cl.$^6$ .................................................. C09D 11/02
[52] U.S. Cl. ................. 106/31.75; 106/31.6; 106/31.65; 106/31.9; 106/31.76
[58] Field of Search ............................. 106/31.75, 31.65, 106/31.9, 31.6, 31.76

[56] References Cited

U.S. PATENT DOCUMENTS

| | | | |
|---|---|---|---|
| 5,169,438 | 12/1992 | Matrick | 106/22 R |
| 5,574,311 | 11/1996 | Belmont et al. | 106/476 |
| 5,630,868 | 5/1997 | Belmont et al. | 106/476 |

FOREIGN PATENT DOCUMENTS

| | | | |
|---|---|---|---|
| 0475075A1 | 3/1992 | European Pat. Off. | C09D 11/00 |
| WO 96/18688 | 6/1996 | WIPO | C09C 1/56 |
| WO 96/18695 | 6/1996 | WIPO | C09D 11/00 |
| WO 96/18696 | 6/1996 | WIPO | C09D 11/02 |

*Primary Examiner*—Helene Klemanski

[57] ABSTRACT

The ink of the invention comprises a vehicle and a colorant. The colorant is a water-insoluble macromolecule that has been chemically modified to be water soluble by addition of functional groups to the surface of the chromophores resulting in water soluble colorant particles. The resulting chromaphore is called a macromolecular chromophore (MMC). The performance of these MMCs is improved by substitution of (a) the normal counter-cations with substituted ammonium cations or (b) the normal counter-anions with any of a variety of organic and inorganic anions. The inks described herein demonstrate high edge acuity, high optical density, fast drying times, high waterfastness, and high smearfastness.

20 Claims, No Drawings

COUNTERION SUBSTITUTION IN MACROMOLECULAR CHROMOPHORE (MMC) FOR INK-JET PRINTING INCLUDING TEXTILE, LARGE FORMAT AND OFFICE FORMAT PRINTERS

TECHNICAL FIELD

The present invention relates to ink compositions for thermal ink-jet printing in a printer such as Hewlett-Packard's DeskJet® printer, large format printers, and textile printers.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum connects to a reservoir for storing the ink. A plurality of such resistor elements forms a pattern in a printhead. This pattern is called a primitive. Each of the resistor elements line up with a nozzle in a nozzle plate, through which ink is expelled toward a print medium. The entire assembly of print-head and reservoir comprises an ink-jet pen.

In operation, each resistor element connects through a conductive trace to a microprocessor, where current-carrying signals cause one or more selected elements to heat. The heating creates a bubble of ink in the chamber, which is expelled through the nozzle toward the print medium. Firing a plurality of such resistor elements, in a particular order, in a given primitive, forms alphanumeric characters, performs area-fills, and provides other print capabilities on the medium.

Ink-jet inks used in thermal ink-jet printing typically comprise a colorant and a vehicle, with the vehicle often containing water and other relatively low surface tension liquids.

The tight tolerances of the nozzles (typically 50 $\mu$m diameter) require that the ink not clog the nozzles. Furthermore, repeated firings of the resistor elements, which must withstand about 10 million firings over the life of the ink cartridge, can result in fouling of the resistor element. Kogation is the term used for this type of fouling. The ink composition must be capable of interacting with the print medium, especially paper, to penetrate it without undue spreading. Finally, the ink composition should be smear and water resistant on the paper.

Many inks possess one or more of the foregoing properties. However, few ink compositions posses all of those properties, since an improvement in one property often results in the degradation of another. Thus, inks used commercially represent a compromise in an attempt to achieve an ink evidencing at least an adequate performance in each of the aforementioned properties.

Accordingly, investigations continue into developing ink formulations that have improved properties such as reduced kogation and reduced crusting (i.e. improved decap). Further properties sought to be improved include high edge acuity, high optical density, fast drying times, good waterfastness, and good smearfastness all without sacrificing performance in other necessary properties.

DISCLOSURE OF INVENTION

In accordance with the invention, inks used in ink-jet printing are provided wherein the edge acuity, optical density, drying time, water resistance, and smear resistance of the inks are improved and kogation and crusting are reduced through the use of an ink for which contains a vehicle and at least one ionic colorant where the colorant comprises pigment particles, the surface of which are treated to substitute ionic functional groups thereonto. This treatment results in water-solubility of a large or macromolecular pigment particle. Such treated particles are called macromolecular ChromoPhores (MMC). The ionic colorant is selected from the group consisting of anionic functionalized colorant particles and cationic functionalized colorant particles, with the counterion replaced by an ion exchange process with another counterion that imparts improved properties to the resulting ink.

Additionally, a method of ink-jet printing which uses the disclosed inks and exploits the inks' properties is provided.

Finally, a method of making the ink using the colorant with the ion exchanged counterion is provided.

BEST MODES FOR CARRYING OUT THE INVENTION

It is well-established that counterion substitution of water-soluble dyes radically affect the performance and printing attributes of inks using these substituted dyes. For example, substitution of tetramethylammonium ions for sodium ions in Direct Black 199 results in improved decap performance over the dye using sodium ions; see, U.S. Pat. No. 5,026,425. See also U.S. Pat. Nos. 4,994,110 (lithium cations); 5,069,718 (potassium cations); and 4,761,180 (tetramethylammonium cations) for examples of other counterion substitution in water-soluble dyes.

In the practice of the present invention, counterion substitution is applied to a functionalized colorant particle with a useful mean diameter ranging from 0.005 to 12 $\mu$m. If the colorant particles are larger than this, they do not remain in solution well enough to be useful in the practice of this invention. Likewise, if the colorant particles are too small, they lack the appropriate properties to be useful in this invention. Colorants of this type result from chemical reactions where solvent-accessible functional groups are derivatized to provide solubilizing groups that render the colorant soluble in water. This resulting macromolecular Chromophore (MMC) is water-soluble, with its solubility being similar to that of well known and commercially used water-soluble acidic and basic dyes.

Depending on the process selected, the MMC can either be anionic or cationic in character. For example, acidic functionality such as sulfonic acid functionalization results from exhaustive sulfonation with fuming sulfuric acid, while carboxylic acid groups result from either chemical or catalytic oxidative reactions. Conversely, basic MMCs containing ammonium ions result from reductive amidation reactions. Regardless of the acidic or basic character of the MMC, appropriate substitution with a compatible counterion provides improved printing attributes such as decap, kogation, bearding, and waterfastness. The general print quality of the output is also improved through counterion substitution.

Colorants suitable for use in this invention include all chemically modified water-soluble pigments (black and color). The chemical modification imparts water-solubility to the pigment precursors which encompass all organic pigments. Under typical chemical processes, the resulting surfaces consist of carboxylate and/or sulfonate functionalities for anionic ChromoPhores, and ammonium functionalities for cationic chromophores. As commercially available, the anionic chromophores are usually associated with sodium cations, while the cationic chromophores are usually associated with chloride or sulfate anions.

These water-soluble black ChromoPhores are commercially available from colorant vendors such as Cabot Corp. and Orient Chemical. Many pigments are useful in the practice of this invention. The following pigments are useful in the practice of the invention; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch® 900, Monarch® 880, Monarch® 800, and Monarch® 700. The following pigments are available from Ciba-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigments are available from Heubach: Dalamar® Yellow YT-858-D and Heucophthal® Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chem: L74-1357 Yellow, L75-1331 Yellow, and L75-2577 Yellow.

It is desired to replace the counterions that are associated with the commercially-available colorants with counterions that impart improved properties to the inks made from these colorants.

Generally, any ammonium-based ion (including quaternary ions) may be used in the practice of this invention as the counterion to an anionic MMC. Some classes of these ions employed in the practice of this invention include, but are not limited to, N,N',N"-substituted and unsubstituted ammonium ions, N,N',N",N'"-substituted and unsubstituted amides of 1,ω-amino acids, N,N'-substituted and unsubstituted lactams of 1,ω-amino acids, N,N',N"-substituted and unsubstituted esters of 1,ω-amino acids, N,N'-substituted and unsubstituted lactones of 1,ω-amino acids. One preferred counterion is dipropyl ammonium.

The terms N,N',N"-substituted and unsubstituted ammonium ions are intended to encompass any substituted or unsubstituted ammonium ion with up to three different alkyl (saturated or unsaturated) and/or aryl substitutions. The preferred number of carbon atoms for each alkyl or aryl group is between 1 and 30 carbon atoms.

The terms N,N',N",N'"-substituted and unsubstituted amides of 1,ω-amino acids are intended to encompass any substituted or unsubstituted amides of 1,ω-amino acids with a carbon backbone of 1 to 20 carbon atoms and with up to four different saturated or unsaturated alkyl and/or aryl substitutions. The number of carbon atoms totaled over all four R groups is between 1 and 40 carbon atoms.

The terms N,N'-substituted and unsubstituted lactams of 1,ω-amino acids are intended to encompass any substituted or unsubstituted lactam of a 1,ω-amino acid with a carbon backbone of 1 to 20 carbon atoms, with a lactam ring of 1 to 20 carbon atoms and with up to two different saturated or unsaturated alkyl and/or aryl substitutions. The preferred number of carbon atoms for each substitution is between 1 and 20 carbon atoms.

The terms N,N',N"-substituted and unsubstituted esters of 1,ωamino acids are intended to encompass all substituted ester of a 1,ω-amino acid with a carbon backbone of 1 to 20 carbon atoms and with up to three different saturated or unsaturated alkyl and/or aryl substitutions. The number of carbon atoms totaled over all substitutions is between 1 and 30 carbon atoms. To provide improved waterfastness, one of the N-substitution sites in this class of molecules should contain H.

The terms N,N'-substituted and unsubstituted lactones of 1,ω-amino acids are intended to encompass all substituted lactones of a 1,ω-amino acid with a carbon backbone of 1 to 20 carbon atoms, with a lactone ring of 1 to 20 carbon atoms and with up to two different saturated or unsaturated alkyl and aryl substitutions. The number of carbon atoms totaled over all substitutions is between 1 and 20 carbon atoms.

When the surface modification of the macromolecular pigment provides cationic functional groups on the surface of the particle, the counterions must be anions. Anionic counterions employed in the practice of this invention include, but are not limited to, halide, sulfate, nitrate, phosphate, sulfonate, carboxylate, carbonate, bicarbonate, borate, tetraborate, tetrafluoroborate, methane sulfonate, methyl benzene sulfonate, phosphite, phosphonate, hexaflurophosphonate, phosphene, phenolate, perchlorate, tungstate, molybdate, and silicate ions.

All concentrations herein are expressed in weight percentages, unless otherwise indicated. The purity of all components is that employed in normal commercial practice for ink-jet inks.

The colorants are prepared by ion-exchanging an undesired counterion associated with a chemically-modified pigment with a desired counterion. The desired ions are exchanged for the undesired using either reverse osmosis or column chromotography to achieve the ion exchange.

The ink comprises the colorant as treated above plus a vehicle. A typical formulation for an ink useful in the practice of the invention includes the colorant (about 0.5 to 20 wt %), one or more cosolvents (0 to about 50 wt %), one or more water-soluble surfactants/amphiphiles (0 to about 40 wt %), one or more high molecular weight colloids (0 to about 3 wt %), and water (balance).

One or more cosolvents may be added to the vehicle in the formulation of the ink. Classes of cosolvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly (propylene glycol) alkyl ethers, higher homologs of poly (propylene glycol) alkyl ethers, N-alkyl caprolactams, unsubstituted caprolactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The cosolvent concentration may range from 0 to about 50 wt %, with about 0.1 to 15 wt % being preferred.

Water-soluble surfactants may be employed in the formulation of the vehicle of the ink. For convenience, examples of surfactants are divided into two categories: (1) non-ionic and amphoteric and (2) ionic. The former class includes: TERGITOLs, which are alkyl polyethylene oxides available from Union Carbide; TRITONs, which are alkyl phenyl polyethylene oxide surfactants available from Rohm & Haas Co.; BRIJs; PLURONICs (polyethylene oxide block copolymers); and SURFYNOLs (acetylenic polyethylene oxides available from Air Products); POE (polyethylene oxide) esters; POE diesters; POE amines; protonated POE amines; POE amides; and dimethicone copolyols. Ionic surfactants such as substituted amine oxides are useful in the practice of this invention. U.S. Pat. No. 5,106,416, "Bleed Alleviation Using Zwitterionic Surfactants and Cationic Dyes" discloses more fully most of the surfactants listed above. The non-ionic amphiphiles/surfactants are more preferred than the ionic surfactants. Specific examples of amphiphiles/surfactants that are preferably employed in the practice of this invention include, but are not limited to, iso-hexadecyl ethylene oxide 20, SURFYNOL CT-111, TERGITOL 15-S-7, and amine oxides, such as N,N-dimethyl-N-docecyl amine oxide, N,N-dimethyl-N-tetradecyl amine oxide, N,N-dimethyl-N-hexadecyl amine oxide, N,N-dimethyl-N-octadecyl amine oxide, and N,N-dimethyl-N-(Z-9-octadecenyl)-N-amine oxide. The concentration of the amphiphiles/surfactants may range from 0 to about 40 wt %, with 2.5 wt % being preferred.

To improve optical density, between 0 and about 3 wt % of at least one high molecular weight colloid derived from natural or synthetic sources may optionally be added to the ink formulation. Addition of a high molecular weight colloid improves print quality. Examples of high molecular weight colloids employed in the practice of this invention include, but are not limited to, alginates, mannuronic acid, carageenan, guar gum, xanthan gum, dextran, chitin, chitosan, carboxymethylcellulose, nitromethylcellulose, and all derivatives thereof. These colloids are disclosed in U.S. Pat. No. 5,133,803, "High Molecular Weight Colloids which Control Bleed." The preferred high molecular weight colloids employed in the practice of this invention include, but are not limited to, low viscosity, Na alginate. The preferred concentration of the high molecular weight component colloid in the inks of this invention is about 0.25 wt %.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The inks are formulated by combining the various components of the vehicle and mixing them with the macromolecular chromophore after exchanging the counterion as disclosed herein.

The inks containing colorants with counterion substitution as described herein demonstrate high edge acuity, high optical density, fast drying times, high water-fastness, and high smearfastness.

EXAMPLE

An ink was formulated with 2 wt % BRIJ 76 (a polyethylene oxide stearyl ether containing 10 units of ethylene oxide), 8 wt % 1,5-pentanediol, 5 wt % colorant as commercially available (with sodium cations), and the balance water. Replacement of substantially all of the sodium cations with dipropyl ammonium ions resulted in an ink having improved waterfastness and decap performance.

INDUSTRIAL APPLICABILITY

The ink compositions of the invention are expected to find use in thermal ink-jet inks, especially where the inks' characteristics, such as high edge acuity, high optical density, fast drying time, waterfastness, and smearfastness, are desired.

Thus, there has been disclosed an ink-jet ink which includes an ionic colorant derived by treating the surface of colorant particles to substitute ionic functional groups thereon. It will be readily apparent to those skilled in this art that various changes and modifications of an obvious nature may be made, and all such changes and modifications are considered to fall within the scope of the invention.

We claim:

1. An ink-jet ink for ink-jet printing which comprises:
(a) a vehicle, and
(b) at least one water-soluble ionic colorant and a corresponding counterion, wherein said ionic colorant comprises anionic functionalized colorant particles and wherein said counterion is a cation selected from the group consisting of N,N',N"-unsubstituted ammonium ions, N,N',N"-unsubstituted ammonium ions, N,N',N", N'"-substituted amides of 1,ω-amino acids, N,N',N", N'"-unsubstituted amides of 1,ω-amino acids, N,N', -substituted lactams of 1,ω-amino acids, N,N'-unsubstituted lactams of 1, ω-amino acids, N,N',N"-substituted esters of 1,ω-amino acids, N,N',N"-unsubstituted esters of 1, ω-amino acids, N,N'-substituted lactones of 1,ω-amino acids, and N,N'-unsubstituted lactones of 1,ω-amino acids; and wherein said corresponding counterion has been associated with said colorant by ion exchange.

2. The ink-jet ink of claim 1, wherein said corresponding counterion is selected from the group consisting of dimethyl ammonium, trimethyl ammonium, and dipropyl ammonium ions.

3. An ink-jet ink for ink-jet printing which comprises:
(a) a vehicle, and
(b) at least one water-soluble ionic colorant and a corresponding counterion, wherein said ionic colorant comprises cationic functionalized colorant particles and said corresponding counterion is an anion selected from the group consisting of halide, sulfate, nitrate, phosphate, sulfonate, carboxylate, carbonate, bicarbonate, borate, tetraborate, tetrafluoroborate, methane sulfonate, methyl benzene sulfonate, phosphite, phosphonate, hexaflurophosphonate, phosphene, phenolate, perchlorate, tungstate, molybdate, and silicate ions; and wherein said corresponding counterion has been associated with said colorant by ion exchange.

4. A method of ink-jet printing comprising printing on a medium with an ink comprising:

(a) a vehicle, and (b) at least one water-soluble ionic colorant and a corresponding counterion, wherein said ionic colorant comprises anionic functionalized colorant particles and wherein said corresponding counterion is a cation selected from the group consisting of N,N',N''-substituted ammonium ions, N,N',N''-unsubstituted ammonium ions, N,N',N'',N'''-substituted amides of 1,ω-amino acids, N,N',N'',N'''-unsubstituted amides of 1,ω-amino acids, N,N'-substituted lactams of 1,ω-amino acids, N,N'-unsubstituted lactams of 1,ω-amino acids, N,N',N''-substituted esters of 1,ω-amino acids, N,N',N''-unsubstituted esters of 1,ω-amino acids, N,N'-substituted lactones of 1, ω-amino acids, and N,N'-unsubstituted lactones of 1,ω-amino acids; and wherein said corresponding counterion has been associated with said colorant by ion exchange.

5. The method of claim 4, wherein said corresponding counterion is selected from the group consisting of dimethyl ammonium, trimethyl ammonium, and dipropyl ammonium.

6. A method of ink-jet printing comprising printing on a medium with an ink comprising:

(a) a vehicle, and (b) at least one water-soluble ionic colorant and a corresponding counterion, wherein said ionic colorant comprises cationic functionalized colorant particles and said corresponding counterion is an anion selected from the group consisting of halide, sulfate, nitrate, phosphate, sulfonate, carboxylate, carbonate, bicarbonate, borate, tetraborate, tetrafluoroborate, methane sulfonate, methyl benzene sulfonate, phosphite, phosphonate, hexaflurophosphonate, phosphene, phenolate, perchlorate, tungstate, molybdate, and silicate ions; and wherein said corresponding counterion has been associated with said colorant by ion exchange.

7. A method for preparing an ink-jet ink for ink-jet printing comprising:

(a) providing colorant particles;

(b) functionalizing said colorant particles to form a macromolecular chromophore having either anionic functionalities or cationic functionalities;

(c) adding a compatible counterion to said macromolecular chromophore using ion exchange techniques;

(d) mixing said macromolecular chromophore and associated counterion with a vehicle to form said ink.

8. The method of claim 7 comprising forming an anionic functionalized macromolecular chromophore containing anions.

9. The method of claim 8, wherein said anions are selected from the group consisting of sulfonate and carboxylate ions.

10. The method of claim 8, wherein said associated counterion is a cation selected from the group consisting of N,N',N''-substituted ammonium ions, N,N',N''-unsubstituted ammonium ions, N,N',N'',N'''-substituted amides of 1,ω-amino acids, N,N',N'',N'''-unsubstituted amides of 1,ω-amino acids, N,N'-substituted lactams of 1,ω-amino acids, N,N'-unsubstituted lactams of 1,ω-amino acids, N,N',N''-substituted esters of 1,ω-amino acids, N,N',N''-unsubstituted esters of 1,ω-amino acids, N,N'substituted lactones of 1,ω-amino acids, and N,N'-unsubstituted lactones of 1,ω-amino acids.

11. The method of claim 10, wherein said corresponding counterion is selected from the group consisting of dimethyl ammonium, trimethyl ammonium, and dipropyl ammonium.

12. The method of claim 7 comprising forming a cationic functionalized macromolecular chromophore containing cations.

13. The method of claim 12, wherein said cations are ammonium ions.

14. The method of claim 13, wherein said associated counterion is an anion selected from the group consisting of halide, sulfate, nitrate, phosphate, sulfonate, carboxylate, carbonate, bicarbonate, borate, tetraborate, tetrafluoroborate, methane sulfonate, methyl benzene sulfonate, phosphite, phosphonate, hexaflurophosphonate, phosphene, phenolate, perchlorate, tungstate, molybdate, and silicate ions.

15. An ink-jet ink for ink-jet printing which comprises:

(a) a vehicle, and (b) at least one water-soluble ionic colorant and a corresponding counterion, wherein said ionic colorant is selected from the group consisting of anionic functionalized colorant particles and cationic functionalized colorant particles; wherein said corresponding counterion has been associated with said colorant by ion exchange; and wherein (1) said anionic functionalized particles have anions on the surface, wherein said anions are selected from the group consisting of sulfonate and carboxylate and wherein said corresponding counterion is an ammonium-based ion, and (2) said cationic functionalized particles have cations on the surface, wherein said cations are ammonium ions and wherein said corresponding counterion is an anion selected from the group consisting of halide, sulfate, nitrate, phosphate, sulfonate, carboxylate, carbonate, bicarbonate, borate, tetraborate, tetrafluoroborate, methane sulfonate, methyl benzene sulfonate, phosphite, phosphonate, hexaflurophosphonate, phosphene, phenolate, perchlorate, tungstate, molybdate, and silicate ions.

16. The ink-jet ink of claim 15 wherein said cation is selected from the group consisting of N,N',N''-substituted ammonium ions, N,N',N''-unsubstituted ammonium ions, N,N',N'',N'''-substituted amides of 1,ω-amino acids, N,N',N'',N'''-unsubstituted amides of 1,ω-amino acids, N,N'-substituted lactams of 1,ω-amino acids, N,N'-unsubstituted lactams of 1,ω-amino acids, N,N',N''-substituted esters of 1,ω-amino acids, N,N',N''-unsubstituted esters of 1,ω-amino acids, N,N'-substituted lactones of 1,ω-amino acids, and N,N'-unsubstituted lactones of 1,ω-amino acids.

17. The ink-jet ink of claim 16, wherein said ammonium-based counterion is selected from the group consisting of dimethyl ammonium, trimethyl ammonium, and diproply ammonium ions.

18. A method of ink-jet printing comprising printing on a medium with an ink comprising:

(a) a vehicle, and (b) at least one water-soluble ionic colorant and a corresponding counterion, wherein said ionic colorant is selected from the group consisting of anionic functionalized colorant particles and cationic functionalized colorant particles; wherein said corresponding counterion has been associated with said colorant by ion exchange; and wherein
(1) said anionic functionalized particles have anions on the surface, wherein said anions are selected from the group consisting of sulfonate and carboxylate and wherein said corresponding counterion is an ammonium-based ion, and
(b) said cationic functionalized particles have cations on the surface, wherein said cations are ammonium ions and wherein said corresponding counterion is an anion selected from the group consisting of halide, sulfate, nitrate, phosphate, sulfonate, carboxylate, carbonate, bicarbonate, borate, tetraborate, tetrafluoroborate, methane sulfonate, methyl benzene sulfonate, phosphite, phosphonate, hexaflurophosphonate, phosphene, phenolate, perchlorate, tungstate, molybdate, and silicate ions.

19. The method of claim 18 wherein said cation is selected from the group consisting of N,N',N''-substituted ammonium ions, N,N',N''-unsubstituted ammonium ions, N,N',N'', N'''-substituted amides of 1,ω-amino acids, N,N',N'',N'''-unsubstituted amides of 1,ω-amino acids, N,N'-substituted lactams of 1,ω-amino acids, N,N'-unsubstituted lactams of 1,ω-amino acids, N,N',N''-substituted esters of 1,ω-amino acids, N,N',N''-unsubstituted esters of 1,ω-amino acids, N,N'-substituted lactones of 1,ω-amino acids, and N,N'-unsubstituted lactones of 1,ω-amino acids.

20. The method of claim 19, wherein said ammonium-based counterion is selected from the group consisting of dimethyl ammonium, trimethyl ammonium, and dipropyl ammonium ions.

* * * * *

UNITED STATES PATENT AND TRADEMARK OFFICE
CERTIFICATE OF CORRECTION

PATENT NO. : 5,830,265
DATED : November 3, 1998
INVENTOR(S) : Tsang et al.

It is certified that error appears in the above-identified patent and that said Letters Patent is hereby corrected as shown below:

Title page,
Line 4, after "FORMAT" insert -- , --.

In the Abstract,
Line 6, delete "maphore" and insert therefor -- mophore --.

In the Specification
Column 1,
Line 51, delete "posses" and insert therefor -- possess --.

Column 2,
Line 9, delete "ChromoPhores" and insert therefor -- chromophores --.
Line 43, delete "Chro-" and insert therefor -- chro- --.
Line 66, delete "ChromoPhores" and insert therefor -- chromophores --.

Column 3,
Line 4, delete "ChromoPhores" and insert therefor -- chromophores --.
Line 58, after "tuted" delete "and unsubstituted".

Column 4,
Line 17, delete "1,ωamino" and insert therefor -- 1, ω-amino --.

In the Claims
Column 6,
Line 46, delete "N,N',N"-unsubstituted" and insert therefor -- N,N'N"-substituted --.
Line 49, delete "N,N'," and insert therefor -- N,N' --.
Line 51, delete "1, ω-amino" and insert therefor --1,ω-amino --.
Line 53, delete "1, ω-amino" and insert therefor --1,ω-amino --.

Column 7,
Line 25, delete "1, ω-amino" and insert therefor --1,ω-amino --.

UNITED STATES PATENT AND TRADEMARK OFFICE
CERTIFICATE OF CORRECTION

PATENT NO. : 5,830,265
DATED : November 3, 1998
INVENTOR(S) : Tsang et al.

It is certified that error appears in the above-identified patent and that said Letters Patent is hereby corrected as shown below:

Column 8,
Line 64, after "and" start a new line.

Column 9,
Line 9, delete "(b)" and insert therefor -- (2) --.

Signed and Sealed this

Eleventh Day of September, 2001

*Attest:*

*Attesting Officer*

NICHOLAS P. GODICI
*Acting Director of the United States Patent and Trademark Office*